Figure 1:
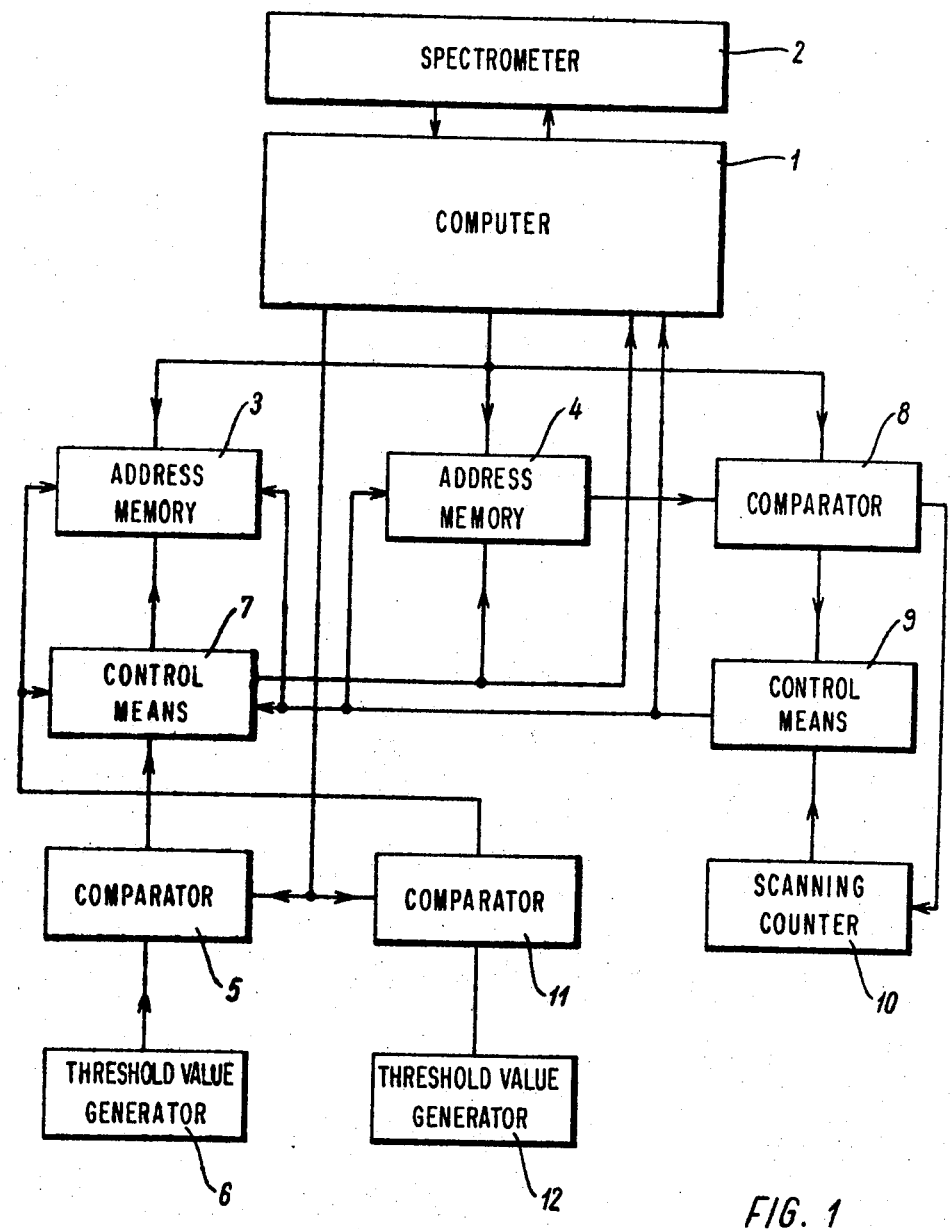

United States Patent [19]
Laukien

[11] 3,717,809
[45] Feb. 20, 1973

[54] DEVICE FOR AUTOMATIC RECORDING OF SPECTRA

[76] Inventor: Gunther Rudi Laukien, Am Silberstreifen, 7501 Karlstruhe-Forchheim, Germany

[22] Filed: July 6, 1970

[21] Appl. No.: 52,486

Related U.S. Application Data

[63] Continuation-in-part of Ser. No. 872,712, Oct. 30, 1969.

[30] Foreign Application Priority Data

April 10, 1970 Germany.....................P 20 17 138.4

[52] U.S. Cl. ...........................324/0.5 R, 235/151.35
[51] Int. Cl. .............................................G01n 27/78
[58] Field of Search ....................324/0.5; 235/151.35

[56] References Cited

UNITED STATES PATENTS

3,297,860   1/1967   Weiss....................................324/0.5

OTHER PUBLICATIONS

B. A. Coles & De Bruce, A Multichannel Digital Integrator, Journal of Scientific Instr., Vol. 42, 1965, pp. 532-533.

*Primary Examiner*—Michael J. Lynch
*Attorney*—Craig, Antonelli and Hill

[57] ABSTRACT

A device for the automatic recording of spectra includes a spectrometer the scanning of which is controlled by a computer over a prescribed number of scans. The computer produces output signals indicative of the mean values resulting from the scans over the prescribed number of scans, as a result of scanning the values over the number of scans divided by either the number of scans or the square root of the number of scans. Address memories are coupled to the computer for identifying the position of the initiation of a point in the scan where the signal amplitude resulting therefrom exceeds a predetermined value and that point subsequent thereto where the signal value drops below the mean value. Threshold generators and comparators are employed to control the initiation of storage and resetting of the address memories. Furthermore, the scanning counter is connected to a control system which, in turn, controls the storage of information in the address memories.

6 Claims, 2 Drawing Figures

DEVICE FOR AUTOMATIC RECORDING OF SPECTRA

This is a continuation-in-part of application of Ser. No. 872,712, filed Oct. 30, 1969.

The present invention relates to a device for automatic recording of spectra, in particular to spin resonance spectrometers provided with an arrangement in which preselected ranges of the spectrum are scanned several times in succession and where the values obtained are reduced to a mean.

A mass spectrometer is known which allows scanning of ranges of interest of the spectrum several times in succession and to for reducing the values obtained to a mean.

For this purpose the ranges of interest are preselected and subsequently the total spectrum containing a plurality of such ranges of interest is scanned several times in succession, while the intermediate ranges are skipped. This method of operation, however, is only applicable to mass spectrometers, because only in the field of mass spectrometry, that is, in analyzing isotopes, it is exactly known which mass lines these isotopes may show. As a matter of fact, the mass lines are exactly defined and, thereby, also the ranges of no interest between these discrete mass lines. Thus, in the recording of the spectrum, the known spectrometer limits the measuring to those discrete lines which the isotope to be analyzed may show. This method of operation, however, is not applicable to such spectrometers which do not predict at which frequencies lines of the spectrum are to be expected and in which only measuring will show at which places and in which density lines are present. Neither as it a problem in the field of mass spectrometry that signals of very weak lines are within the noise level of the measuring instrument, at the risk that such lines will not be detected. Consequently, the known arrangement for recording preselected spectrum ranges several times in succession is not applicable to cases where it is not known at which places lines of the spectrum will appear and in cases where the lines may be of any density or width.

The object of the present invention, therefore, is to provide a device which allows also automatic recording of spectra for which the location and width of lines cannot be predicted and which may also show lines such weak that, substantially, they disappear in the noise level of the measuring instrument.

According to the present invention this is accomplished by providing the device at least with a first threshold value discriminator in which the signal amplitude is compared with a first, given threshold value and which generates control signals causing repetition of the spectra recording in the ranges in which the signal amplitude exceeds the first threshold value.

This threshold value may be selected so as to lie slightly above the mean noise level so that, by repetition in this range, signals can be lifted out of the noise level since the signal amplitudes cumulate, whereas the cumulation of the non-coherent noise signals is merely proportional to the square root. Thus, the employment of the threshold value discriminator allows one to record a spectrum with a maximum precision independent of human observation or evaluation of spectrograms and, at the same time, to cover very weak lines with a maximum of precision without losing valuable time by an unnecessary repetition of the total spectrum. Accordingly, the present invention allows one to use automatic spectrometers with the highest efficiency possible, since the measuring time is reduced to a minimum. A particularly preferred application of the device according to the present invention is in the field of spin resonance spectrometry.

In a further embodiment of the present invention, the device is provided with a second threshold value discriminator in which the signal amplitude is compared with a second, given threshold value set higher than the first and which generates control signals causing termination of the repetition of spectra recording in the range determined by the exceeding of the first threshold value. This measure ensures that unnecessary repetition of such partial ranges in which the signal amplitude has a peak value far above the noise level is prevented. The second threshold value discriminator may already respond during the first scanning operation so that repetition of this partial range is precluded altogether or it may, however, respond only if the second threshold value has been reached after several repetitions in order to eventually terminate the repetition of this range.

In the second threshold value discriminator the signal amplitudes reduced to a mean are compared with the second threshold value. Signal amplitudes reduced to a mean are defined as the signal amplitudes added up and possibly divided by a suitable factor. In this connection it is also possible to use a threshold value which increases from scanning operation to scanning operation, in particular, if division of the added up signal amplitudes is dispensed with. It is expedient to select the reduction to a mean and/or the increase of the threshold value in such a way that the number of scannings, required for the means signal amplitude to reach the threshold value, is a direct measure for the signal amplitude. In this case, it will be sufficient to provide a scanning counter which indicates for each range of interest the number of repetitions the signal amplitude required to reach the second threshold value in this range, in order to obtain additional information on the absolute magnitude of the signal amplitude.

Instead of or also in addition to this second threshold value discriminator, the device may be provided with a further scanning counter which counts the number of repetitions of spectra recording within a certain range and which, at a preset number of repetitions, generates control signals causing termination of the repetition of the spectra recording in this range. In this way it is ensured that, in case a range of interest has been delimited to increased noise by the response of the first threshold value discriminator, said range is not repeated for an unnecessary length of time if no signal appears in this range. In case the second threshold value is not reached with the signals being very weak, it may also be of advantage to discontinue the repetition of the spectra recording if a more precise analysis of such a very weak line is of no interest.

In one embodiment of the present invention, the control signals of the first threshold value discriminator become effective without delay so that the total spectrum is covered only once. Thus, the total spectrum is scanned from one end and subsequently, if a range of interest is detected, said range is repeated for such a length of time as may be considered necessary before scanning of the spectrum beyond this range will be continued. Whenever a range of interest appears during the continued recording of the spectrum, said range is scanned several times in succession so that, despite scanning the ranges of interest several times in succession, the total spectrum is scanned only once in a single operation. The aforementioned second threshold value discriminator and/or the counter then control the number of repetitions in the respective range of interest. In this case, it is expedient to scan the total spectrum at constant speed.

Although, in principle, the highest scanning speed can be achieved by this arrangement, in some cases it may be advantageous to employ another embodiment of the present invention in which the total spectrum is covered during each scanning operation and in which the control signals cause only the ranges of interest to be scanned at optimum scanning speed, whereas the remaining ranges of no interest are scanned at higher speed or skipped altogether. This embodiment of the present invention is preferred in cases where disturbances in the substance to be analyzed are caused during the recording of spectra and where these disturbances must have decayed before the scanning operation can be repeated. Such disturbances, for example, are encountered in the field of spin resonance spectrometry, since spin resonances involve a considerable relaxation time precluding immediate repetition of the spectra recording. In the latter embodiment of the present invention, the waiting time owing to relaxation is used for scanning other ranges of interest of the spectrum before scanning of a particular range is repeated; the loss of time resulting from scanning the total spectrum several times in succession is negligible because the ranges of no interest are covered at increased speed or skipped. In this case, the second threshold value discriminator and/or the counter ensure that, on reaching the second threshold value or a preset counter reading, also such ranges will be covered at increased speed or skipped which have previously been covered at optimum scanning speed as ranges of interest.

In the latter embodiment of the present invention, the control signals are able to limit the scanning at optimum speed to the ranges of interest in subsequent repetitions only after one or several initial scannings of the total spectrum have been performed. In this case, it is possible to determine by means of separate evaluation on the basis of the total spectrum recorded first if, in addition to the automatically selected ranges, further ranges are still to be scanned several times in succession or if automatically selected ranges are to be precluded from scanning.

It is conceivable that, with the method of operation described last, the number of ranges of interest in the spectrum decreases continuously, since the number of the originally interesting ranges in which the signal amplitudes reduced to a mean reach the threshold value and which, in further scanning operations, are therefore covered at high speed or skipped, increases together with the number of scannings. Since, with a decreasing number of interesting ranges, the time required for scanning the spectrum also decreases, this time may be found to become shorter than the relaxation time of the processes excited in the scanning operation. To make sure that, in any case, the relaxation of such processes will take place before the next scanning, one embodiment of the present invention provides an arrangement by means of which repetition of scanning is delayed for such a length of time respectively that the time interval between successive scannings of an equal range of interest is at least as long as the relaxation time of the process excited in this range during scanning. For this purpose it will be sufficient to ensure that two scannings of the total spectrum are not allowed to succeed each other at time intervals shorter than the longest possible relaxation time.

One particular embodiment of the present invention comprises a computer to control a step-by-step scanning of the spectrum and to store the signal amplitudes obtained by the scanning in addresses assigned to successive frequencies of the spectrum. It also comprises two address memories coupled to the computer, of which the first address memory, in response to the control signal of the first threshold discriminator stores the computer-supplied address of the frequency at which the signal amplitude reaches the first threshold value, whereas the second address memory stores the addresses of that frequency at which the signal amplitude again drops below the first threshold value. Connected to the two address memories is a control system causing the spectrum between two such stored addresses to be scanned several times in succession, that is, either in such a way that, according to the one embodiment of the present invention, repeated scanning is performed immediately in case of one single coverage or at normal scanning speed in case of scanning the total spectrum several times in succession.

In this embodiment of the present invention, the control system may comprise a second comparator where the address stored in the second address memory is compared with the addresses supplied by the computer and which, in case of agreement, feeds control signals to the scanning counter which is connected to a control system causing the scanning of the spectrum to be repeated, until a preselected condition is obtained in the scanning counter.

Finally, the control signal of the second threshold value discriminator is able to cause the address in the first address memory to be erased and, if need be, the control system to be returned to a reset condition.

For further details and variations of the present invention, reference is made to the following detailed description and explanation of the invention on the basis of the embodiment shown on the drawing. The features specified in the description and drawing may be employed in other embodiments of the present invention either individually in a self-contained manner or collectively in any desired combination. In the accompanying drawings FIG. 1 shows the block diagram of a device according to the present invention for the immediate repetition of ranges of interest in one single coverage of the total spectrum and FIG. 2 shows the block diagram of a device according to the present invention for several repetitions of the total spectrum at high scanning speed or skipping of ranges which are of no interest.

Figure 2:
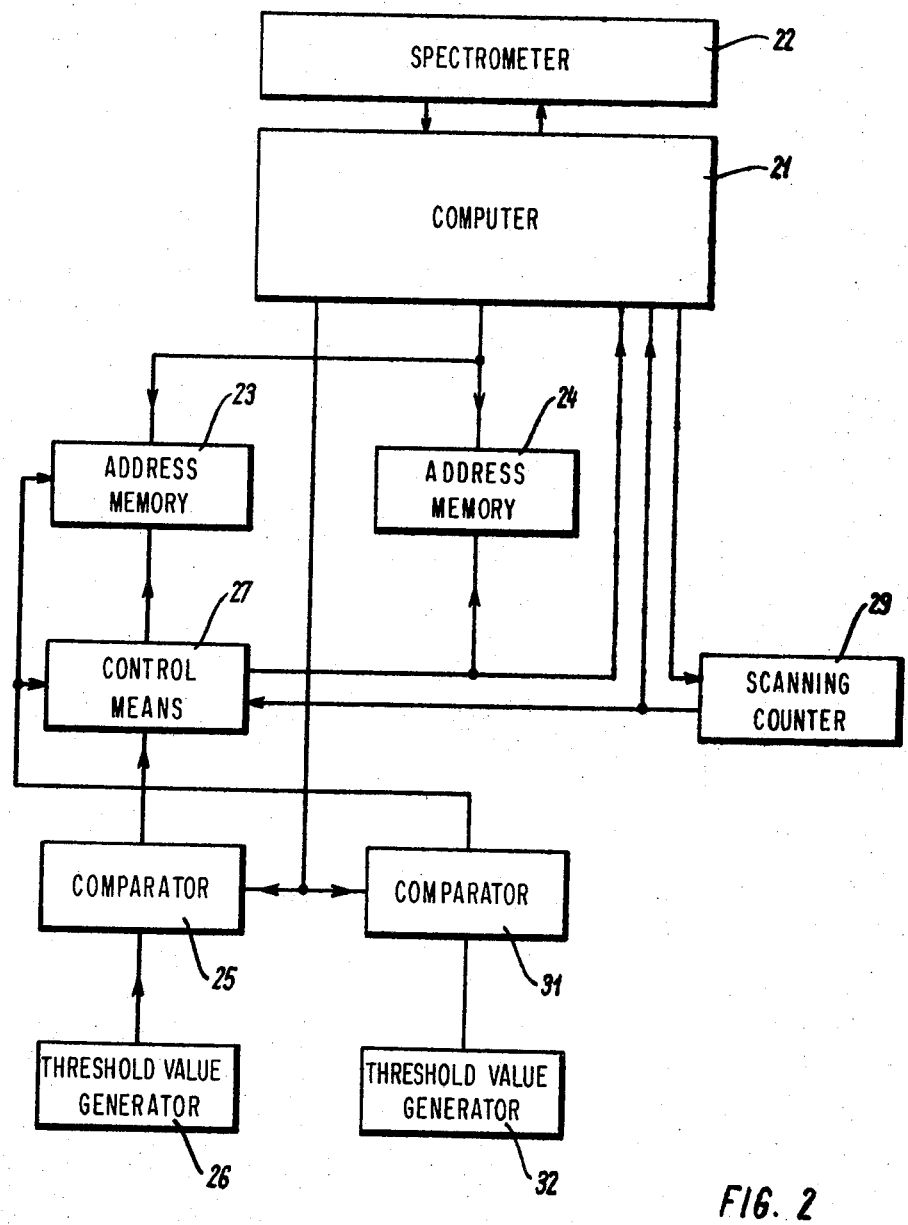

The device shown in FIG. 1 comprises a computer 1 such as the FT 1064 computer produced by Fabri-Tek Instruments Incorporated, a fixed hard-wired average-value (pulse) computer which, in a known manner, is coupled to a spectrometer 2 such as Type NX-90 made by Bruker-Physi, AG of Karlsruhe, Forchheim, Germany, and causes the spectrometer to scan step by step the spectrum to be analyzed. For instance, computer 1, in the case of a nuclear resonance spectrometer, may cause a step-by-step adjustment of the excitation frequency and allocate to each frequency an address where the signal recorded by the spectrometer is stored. In a known manner, obviating any more detailed description, the computer may, furthermore, contain an arrangement for reducing the values to a mean by means of which, on repeated scanning of the spectrum, the signals associated with the same address are added up and processed at will, for example by reduction to the arithmetic or geometric mean.

Connected to the computer are two address memories 3 and 4 such as Type SN 7474 Memory Address Register, manufactured by Texas Instruments Corp. or described in Sec. 6-55 of "The Integrated Circuit Catalog" of Texas Instruments, and a first comparator 5 such as a Digital Comparator of integrated switching circuits, particularly a type SN 7486 Comparator manufactured by Texas Instruments Corp. and described in Sec. 9-296 of "The Integrated Circuits Catalog" of Texas Instruments. The comparator is supplied with those signal amplitudes which are associated with the addresses fed to the address memories 3 and 4. In comparator 5, the signal amplitude is compared with a first threshold value which is supplied by a threshold value generator 6, which may be a digital input switch such as a turn switch or a Digiswitch produced by Contraves in Switzerland. This threshold value can be preselected and is usually set just above the average noise level. When the signal amplitude reaches the threshold value setting of threshold value generator 6, comparator 5 transmits a signal to control means 7 such as a Series SN 74 type of integrated switching control circuit, produced by Texas Instruments Corp. and described in Section 6 of the above-mentioned catalog, which causes the first address memory 3 to store the address which is associated with the place where the signal amplitude has reached the preselected threshold value. If, subsequently, the signal amplitude again drops below the preselected threshold value, which is ascertained by means of comparator 5, the control means 7 connected to the comparator supplies a further signal causing the second address memory 4 to store the address of the signal at which the signal amplitude has again dropped below the threshold value setting of threshold value generator 6. Accordingly, by means of the two address memories 3 and 4, the limits of a partial range of the spectrum are automatically defined, that is, those limits at which the signal amplitude rises above and drops below a preselected threshold value and which is to be scanned several times in succession to determine the presence, or absence, of a true signal.

To repeat scanning of the range as defined by the addresses stored in address memories 3 and 4, control means 7, together with the address storage command signal to address memory 4, transmits to computer 1 a second signal commanding to return to address 3 and to repeat scanning from there. To ensure that this return can be performed several times, a second comparator 8 is provided which is fed with addresses produced by the computer so that said addresses are compared with the addresses stored in the second address memory 4. In case of agreement of the two addresses, a control means 9, coupled to the second comparator 8, receives a signal which, in turn, transmits the return command signal to the computer. Moreover, in case of agreement of the addresses in comparator 8, a signal is transmitted to scanning counter 10. If the number of repeated scannings has reached a number preselected in the scanning counter, the scanning counter generates a signal which is fed to control means 9 and causes the control system to reset the two address memories 3 and 4 as well as the associated control means 7 so that, after termination of the last scanning repetition, the second address memory supplies no address to comparator 8 and, consequently, no return signal can be triggered. As a result, scanning of the spectrum is continued in accordance with the number of repetitions of a partial range which has been preselected by scanning counter 10, such as type SN 7493 Scanning counter produced by Texas Instruments Corp. and described in Section 9-19 of the above mentioned catalog.

To prevent repeated scanning of a partial range, when the signal amplitude between the addresses stored in the two address memories 3 and 4 reaches a high signal value which makes repeated scanning of the spectrum unnecessary, a third comparator 11 is provided to which computer 1 supplies the signal amplitude reduced to a mean and to which a second threshold value generator 12 supplies a threshold value which is higher than the threshold value determining the limits of the range to be scanned again. When the signal amplitude, reduced to a mean in computer 1 and supplied to the second comparator 11, reaches the threshold value supplied by the second threshold value generator 12 to comparator 11, comparator 11 will transmit to the first address memory 3 and to the control means 7 connected therewith a signal which sets both components back to zero. By means of a simple counting circuit not shown in detail, it can be ensured that resetting of address memory 3 and of control means 7 by the third comparator 11 is precluded when the address stored in the first address memory 3 and the address where the third comparator 11 supplies a signal are spaced too far apart. Furthermore, the signal of comparator 11, in this case, could be used to cause repeated scanning of the range between the address stored in the first address memory 3 and the response of the third comparator 11.

A signal amplitude reduced to a mean is defined as the signal amplitude summed over n scannings and divided by a suitable factor, if necessary. If the signal amplitude is divided by n the mean signal amplitude remains constant while the noise level decreases. Division of the added up signal amplitude by the factor $\sqrt{n}$ is especially suitable because in this case the noise level remains constant while the signal amplitude increases. If division of the summed signal amplitude is dispensed with, also a threshold value, increasing from scanning operation to scanning operation, preferably proportionally to factor $\sqrt{n}$, can be used for the second comparator.

The device shown in FIG. 2, in the same way as the device shown in FIG. 1, also comprises a computer 21 which is coupled to a spectrometer 22 and which causes the spectrometer to scan step by step the spectrum to be analyzed. Again, two address memories 23 and 24 and a first comparator 25 are connected to said computer 21, a threshold value generator 26 supplying a first threshold value to comparator 25. Comparator 25 is connected to control means 27 which, in the aforementioned manner, causes the first address memory 23 to store the address assigned to the place where the signal amplitude has reached the preselected, first threshold value. In this arrangement, too, control means 27 transmits a further signal to the second address memory 24 when the signal amplitude again drops below the preselected threshold value so that the corresponding address is stored.

Also provided is a second comparator 31 which is connected to computer 21 and to a second threshold value generator 32 and which is used to supply a signal to address memory 23 and to control means 27 when the signal amplitude reduced to a mean in the computer reaches the second threshold value to reset both components to zero. Also in this arrangement, it can be ensured by means of a simple counting circuit not shown in detail that resetting of address memory 23 and of control means 27 by means of the second comparator 31 is no longer possible when the address contained in the first address memory 23 and the address where the second comparator 31 transmits a signal are spaced too far apart; and in this case, too, repeated scanning of the range between the address contained in the first address memory 23 and the address where the second comparator 31 responds could be achieved.

The operations described above are performed during the scanning of the first or last of several first scannings of the spectrum during which scanning(s) the total spectrum is covered at normal scanning speed and in the course of which the ranges of interest are defined by storing the addresses in address memories 23 and 24. On further repetitions of the scanning caused by computer 21 whose number is recorded by a scanning counter 29 connected to computer 21 and control means 27, control means 27 respectively causes very rapid coverage or, with the transmitter amplitude reduced or suppressed, even skipping of the range of a spectrum up to an address contained in the first address memory 23, whereas the critical ranges between the addresses stored in the first address memory 23 and the addresses associated with these addresses, as contained in the second address memory 24, are covered at normal scanning speed, so that in the critical ranges the spectrum is recorded, while the intermediate ranges of no interest are covered at a speed so high that the time required for this operation is negligible. Therefore, the successive, relevant ranges in the total spectrum are recorded successively without noticeable loss of time, and, nevertheless, each range is allowed sufficient time for relaxation because the time required for scanning other ranges lies between successive scanning operations of the same range. On reaching a certain number of scannings, scanning counter 29 may either transmit to computer 21 a control signal by which the recording of spectra is terminated or, in case the scanning of a range is terminated by means of a control signal from the second comparator 31 on reaching a certain signal amplitude, said scanning counter may indicate the number of scannings performed in this range and, in particular, cause this number to be printed out.

In case the spectrum contains only a few ranges to be scanned it may occur that the time required for scanning the total spectrum is shorter than the relaxation time of the processes excited during scanning. To avoid disturbances which may result from scanning before the termination of relaxation, for example an appropriate timing device in the computer may ensure that the time interval between successive scannings of the total spectrum is at least as long as the relaxation time.

It is apparent that by the present invention an extremely simple device is provided for economic recording of spectra. It shall be understood that the present invention is not limited to the embodiments shown by way of example, but that variations thereof are possible without exceeding the scope of the present invention. A great variety of logical circuits is conceivable by which devices according to the present invention may materialize. Furthermore, the circuits shown may contain components which permit any desired preselection at will of partial ranges to be repeated. Furthermore, it is conceivable to provide analogue arrangements to replace the digital arrangements shown by way of example, when the spectrometer causes continuous scanning of the spectrum.

I claim:

1. In a method for recording spectra, especially nuclear and electron resonance spectra, comprising the steps of:
   scanning a sample of material to produce at least one signal representative of the characteristics of the sample, over a frequency spectrum, a plurality of times in succession, to detect spectrum signal values having prescribed characteristics; and
   reducing the signal values detected within at least one prescribed range within said spectrum to a mean value;
   the improvement wherein said step of scanning comprises scanning the sample over a spectrum range, other than said at least one prescribed range, at a rate faster than the rate at which said at least one prescribed range is scanned in response to the amplitude of the signal values detected during the scanning of the sample, so that the portion of the spectrum other than said at least one prescribed range over which said sample is scanned will be scanned at an increased speed or skipped.

2. A method according to claim 1, further including the steps of comparing the amplitude of detected signal values with a preselected threshold value and setting the limits of said at least one prescribed range in response to the points at which said detected signal values rise above and fall below said preselected threshold value, respectively.

3. A method according to claim 2, further comprising the step of repeating the scanning of said sample over said at least one preselected range when the detected signal amplitude for said range fails to exceed a predetermined value for a specified spectrum interval following the initial point in the spectrum from which said range is defined.

4. A method according to claim 1, wherein the limits of said at least prescribed range, over which at least one subsequent scan is to be carried out, are determined in response to the values detected during the initial scan, by scanning the total spectrum initially at a constant scanning speed.

5. A device for the recording of spectra comprising:

a spectrometer for producing a spectrum of signal values to be recorded;

a computer, coupled to said spectrometer, for controlling the step-by-step scanning of the spectrum by said spectrometer and for storing and reducing to a mean specified signal amplitude values provided by said spectrometer;

first means, responsive to the output of said spectrometer and being coupled to said computer, for storing the address corresponding to a first point in the spectrum being scanned by said spectrometer, at which the signal amplitude value produced by said spectrometer reaches a first threshold value;

second means, responsive to the output of said spectrometer and being coupled to said computer, for storing the address corresponding to a second point in said spectrum subsequent to said first point, at which the signal amplitude value provided by said spectrometer drops below said first threshold value; and third means, responsive to the outputs of said first and second means and coupled to said spectrometer, for limiting the rate of scanning of said spectrometer over at least one prescribed range defined by the contents of said first and second means, to a rate lower than the rate of scanning of the portion of the spectrum other than said at least one prescribed range.

6. A device according to claim 5, further comprising fourth means, coupled to said first means and being responsive to the output of said spectrometer, for causing the contents of said first means to be erased when the output of said spectrometer exceeds a second threshold value.

* * * * *